Feb. 14, 1961 T. H. BONN ET AL 2,972,059

BIASED CARRIER FOR MAGNETIC AMPLIFIERS

Filed Nov. 12, 1954 4 Sheets-Sheet 1

INVENTORS
THEODORE H. BONN
RICHARD W. SPENCER

BY

ATTORNEY

BIASED CARRIER FOR MAGNETIC AMPLIFIERS

Filed Nov. 12, 1954

INVENTORS
THEODORE H. BONN
RICHARD W. SPENCER

BY Efurey Sight
ATTORNEY

Feb. 14, 1961 T. H. BONN ET AL 2,972,059

BIASED CARRIER FOR MAGNETIC AMPLIFIERS

Filed Nov. 12, 1954 4 Sheets-Sheet 3

INVENTORS
THEODORE H. BONN
RICHARD W. SPENCER

BY [signature]

ATTORNEY

INVENTORS
THEODORE H. BONN
RICHARD W. SPENCER
BY
ATTORNEY

United States Patent Office 2,972,059

Patented Feb. 14, 1961

2,972,059

BIASED CARRIER FOR MAGNETIC AMPLIFIERS

Theodore H. Bonn and Richard W. Spencer, Philadelphia, Pa., assignors to Sperry Rand Corporation, a corporation of Delaware Filed Nov. 12, 1954, Ser. No. 468,468

11 Claims. (Cl. 307—88)

The present invention relates to magnetic amplifier circuits and is more particularly concerned with an improved full wave carrier magnetic amplifier.

Magnetic amplifiers have, in the past, been utilized in a number of circuit configurations and one such configuration has been termed a two-core self-saturating magnetic amplifier circuit. Such a circuit comprises a pair of magnetic amplifiers coupled respectively to potential sources respectively of opposite and alternating polarity. The magnetic amplifiers are also interconnected to one another by appropriate windings on each, whereby in the normal course of operation, energy coupled to one of the said amplifiers, during an output producing time interval, is also coupled to the other of the said amplifiers to condition the core thereof preparatory to the subsequent coupling of power thereto.

In operation, the self-saturating magnetic amplifier produces an output which is dependent upon the input signal and upon the amplitudes of any direct bias currents applied to the windings. Bias currents effectively add to the signal current, and frequently are used in order that the gain and response characteristics, which are not linear functions of input or bias, may be made optimum for the expected amplitude and polarity of the input signals. Thus, an input signal produces an increment of output which adds to or subtracts from the quiescent or no-signal output.

Known types of two-core self-saturating magnetic amplifiers have been subject to the disadvantage that, under appropriate conditions of operation, power may be delivered to the load circuit from the input circuit whereby a considerable portion of the input power may in fact be wasted. This effect has been especially pronounced when, in an attempt to decrease the fall time of the magnetic amplifier circuit, the magnitude of signal or bias input has been increased. In addition, prior art magnetic amplifiers of the type under discussion have exhibited a relatively poor power gain-bandwidth product.

The present invention is particularly concerned with an improved self-saturating magnetic amplifier which serves to obviate the foregoing difficulties.

It is accordingly an object of the present invention to provide an improved single core or two-core self-saturating magnetic amplifier circuit.

A further object of the present invention resides in the provision of a magnetic amplifier circuit having an improved power gain-bandwidth product.

Still another object of the present invention resides in the provision of a magnetic amplifier circuit energized by an asymmetrical carrier voltage whereby power delivered to the load circuit from the signal circuit may be materially decreased and may in fact be completely eliminated under appropriate conditions of operation.

Still another object of the present invention resides in the provision of a two-core series self-saturating magnetic amplifier having a decreased fall time.

In effecting the foregoing objects and advantages, the present invention utilizes a single core or two-core self-saturating magnetic amplifier circuit which is energized by an asymmetrical carrier voltage waveform whereby the said carrier waveform has an effective negative average value. As will be discussed more fully, the use of such an asymmetrical carrier waveform may be accomplished in a variety of ways in accordance with the present invention, among which are the provision of bias batteries in series with the power source and/or in series with the load; the provision of a self-biasing arrangement in series with the load; or the provision of a truly asymmetrical carrier waveform generated externally by appropriate circuitry. The use of such an asymmetrical carrier voltage in conjunction with a two-core self-saturating magnetic amplifier in accordance with the present invention serves to increase the power gain bandwidth product of the said amplifier arrangement; serves to decrease the fall time to values below that of circuits known to the present time; and further serves to materially reduce the power delivered to the load circuit from the signal circuit, whereby the capacity of the input signal source in turn need be much less than has been the case heretofore.

The foregoing objects, advantages, construction and operation of the present invention will become more readily apparent from the following description and accompanying drawings, in which:

Figures 9 (A and B) are schematics illustrating still further modifications in accordance with the present invention.

Figure 7:
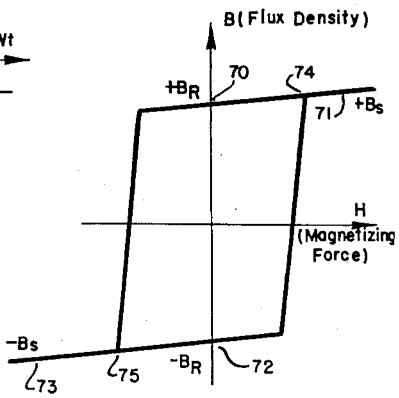
Figure 7 is an idealized hysteresis loop of a magnetic material which may preferably be employed in the cores of the magnetic amplifiers utilized in the present invention.

Referring initially to the hysteresis loop shown in Figure 7, it will be seen that the magnetic amplifiers of the present invention may preferably but not necessarily utilize magnetic cores exhibiting a substantially rectangular hysteresis loop. Such cores may be made of a variety of materials, among which are the various types of ferrites and various kinds of magnetic tapes, including Orthonik and 4–79 Moly-permalloy. These materials may further be given different heat treatments to effect different desired properties. In addition to the wide variety of materials applicable, the cores of the magnetic amplifiers to be discussed may be constructed in a number of different geometries, including both closed and open paths. For example, cup-shaped cores, strips of material, or toroidal cores may be used; it must be emphasized, however, that the present invention is not limited to any specific geometries of its cores nor to any specific hysteretic configuration therefor, and the examples to be given are illustrative only.

Referring now to the hysteresis loop shown in Figure 7, it will be noted that the curve exhibits several significant points of operation, namely, point 70 (plus B*r*), which represents a point of plus remanence; the point 71 (plus B*s*), which represents plus saturation; the point 72 (—B*r*), which represents minus remanence; the point 73 (—B*s*), which represents minus saturation; the point 74 which represents the beginning of the plus saturation region; and the point 75 which represents the beginning of the minus saturation region.

Discussing for the moment the operation of a device utilizing a core which exhibits a hysteresis loop such as has been described in reference to Figure 7, let us initially assume that a coil is wound on the said core. If the core should initially be at the operating point 70, plus remanence, and if a voltage pulse should be applied to the said coil, which pulse produces in the coil a current creating a magnetomotive force in a direction tending to increase the flux in the said core (i.e. a direction of plus H), the core will tend to be driven from the point 70 (plus B*r*) to the region of point 71. During this state of operation, there is relatively little flux change through the said core and the coil therefore presents a relatively low impedance whereby energy fed to the said coil during this state of operation will pass readily therethrough and may be utilized to effect a usable output.

On the other hand, if the core should initially be at point 72 (—B*r*) prior to the application of the plus H pulse, upon application of such a pulse the core will tend to be driven from the said point 72 (—B*r*) to the region of plus saturation. The pulse magnitude should preferably be so selected that the core is driven only to the beginning of the plus saturation region, namely, point 74. During this particular state of operation there is a very large flux change through the said core and the coil therefore exhibits a relatively high impedance to the applied pulse. As a result, substantially all of the energy applied to the coil, when the core is initially at —B*r*, point 72, will be expended in flipping the core from point 72, preferably to the point 74, and thence to point 70 with very little of this energy actually passing through the said core to give a useful output. Thus, depending upon whether the core is initially at point 70 (plus B*r*), or at point 72 (—B*r*), an applied pulse in the plus H direction will be presented respectively with either a low impedance or a high impedance and will effect either a relatively large output or a relatively small output. These considerations are of value in the construction of the two-core self-saturating magnetic amplifiers of the present invention.

Figure 1:
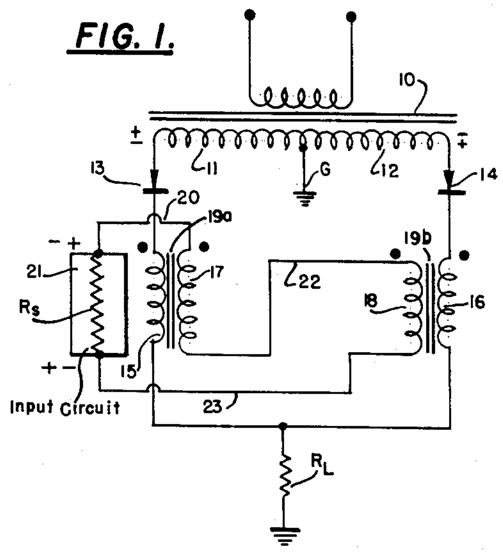
Figure 1 is a circuit diagram depicting one form of two-core self-saturating magnetic amplifier in accordance with the present invention.

Referring now to Figure 1, it will be seen that such a magnetic amplifier circuit may comprise two cores 19*a* and 19*b*, preferably but not necessarily exhibiting a hysteresis loop substantially similar to that discussed in reference to Figure 7. Core 19*a* carries two windings thereon, namely, windings 15 and 17; and core 19*b* carries two further windings thereon, namely, windings 16 and 18. It should be noted that, as a practical matter, the windings 17 and 18 may in fact comprise a single winding carried by and linking both of the cores and it should be understood therefore that, when reference is made in the subsequent description and claims to the two windings 17 and 18, this alternative single winding configuration is meant to be included in the language used.

The two cores shown are selectively energized by alternate phases of a source of carrier voltage, of a frequency relatively high in comparison to that of the signal to be discussed subsequently. The said carrier voltage is coupled to the two amplifiers via a transformer 10 of conventional configuration, and having a secondary winding, center tapped at a point G, as shown, to define two winding portions 11 and 12. One end of transformer winding portion 11 is coupled via a rectifier 13 to one end of the said amplifier winding 15 and the other end of amplifier winding 15 is in turn coupled to a load impedance $R_L$. Similarly, one end of the transformer winding portion 12 is coupled via a further rectifier 14 to one end of the amplifier winding 16 and the other end of the said amplifier winding 16 is also coupled to the load impedance $R_L$. One end of amplifier winding 17 is coupled by a line 20 to an input circuit or signal source 21 and the other end of the said winding 17 is coupled by a further line 22 to one end of amplifier winding 18. The other end of the said amplifier winding 18 is again returned via a line 23 to the said input circuit or signal source 21.

It should be noted that, in the particular circuit shown, the rectifiers 13 and 14 are interposed between the transformer 10 and the amplifier windings 15 and 16, rather than between the said amplifier windings 15 and 16 and the load $R_L$, which latter construction has been customary heretofore. The configuration thus actually employed in the present invention has a number of advantages over the prior art structure. Stray capacitance between the lower ends of windings 15 and 16 does not now affect the operation of the amplifier since these points are at the same potential; stray capacitance from the windings 15—16 to the amplifier control windings 17—18 is less troublesome since the said control windings undergo smaller excursions of voltage; stray capacitance between ground and the lower ends of windings 15 and 16 now shunts only the load impedance $R_L$ and not the rectifiers 13 and 14; and at least one less lead is necessary in assembling the amplifier inasmuch as the lower end of winding 15 is now connected directly to the lower end of winding 16. The present invention, in addition to the other objects and advantages discussed previously, therefore contemplates the provision of a magnetic amplifier connected as shown in Figure 1 to effect the additional advantages given above.

For purposes of illustration only, the input circuit or signal source 21 is shown to have an internal resistance $R_S$, and this representation has been employed, as will become apparent from the following discussion, inasmuch as the said source 21 should be capable of receiving a reverse current at its input terminals under appropriate operating conditions. The arrangement of carrier wave source coupled to the transformer 10, winding portions 11 and 12, rectifiers 13 and 14, and load $R_L$, as will become apparent upon an examination, are similar to a full wave rectifier and the voltage waveform considerations normally present in respect to such a full wave rectifier are of value in understanding the circuit of Figure 1.

Referring again to Figure 1, and making reference to the discussion of Figure 7, let us assume that core 19A is initially at an operating point —B*r*, point 72, and that the carrier waveform across the winding portions 11 and 12 is at this time such that the lefthand end of transformer winding portion 11 is positive with respect to the grounded center tap G of the said winding, while the righthand end of transformer winding portion 12 is negative with respect to the grounded center tap G. Under such a state of energization, current will flow through rectifier 13 and thence through winding 15 of the lefthand magnetic amplifier. The energy thus coupled to the said lefthand magnetic amplifier, however, will not be capable of producing a major or usable output, but will merely suffice to flip the core from the point 72 to the point 70, via the point 74, during one half-cycle of the applied power potential. During this state of operation a voltage will be induced in winding 17 and will be coupled via winding 18 to the righthand magnetic amplifier shown in Figure 1. The amplifier winding polarities are such with respect to the core 19B that the voltage thus induced in winding 18, during the conduction of rectifier 13, will partially set the core 19B to its operating point 72, namely, minus remanence. Only a partial setting of core 19B, for instance, is effected inasmuch as the resistance of source $R_S$ creates a voltage drop whereby less than the entire voltage induced in winding 17 appears across winding 18. A negative bias voltage (not shown) is normally required to compensate for the drop in $R_S$ if minimum output is to be obtained. Without this bias (which may be, for instance, a D.C. source in series with $R_S$), the cores will be reset less and less for each cycle of applied power potential until full output occurs. In this respect, therefore, a distinction should be noted between a signal which may be supplied by source $R_S$, and the input bias present at the source $R_S$. The input bias may in fact be such that, under "no-signal" conditions the amplifier may effect, for instance, half output whereby the amplifier output may respond equally to both positive and negative signals.

During the next half of the applied carrier wave input cycle, when the righthand end of transformer winding 12 becomes positive and the lefthand end of transformer winding 11 becomes negative with respect to the grounded center tap G, current flowing through the rectifier 14 and amplifier winding 16 will again suffice merely to flip the core from operating point 72 to the point 70 via the point 74. This action will once more induce a further voltage in amplifier winding 18, which voltage will be coupled via line 22 back to the winding 17 of the lefthand magnetic amplifier and will partially reset the amplifier core 19*a* from its operating point 70 to the point 72 preparatory to the next reversal of polarity of the input carrier voltage. Thus, provided a proper bias potential is included in series with $R_S$, in the absence of any applied signal no useful output will appear across the load $R_L$ and successive reversals in polarity of the input carrier wave voltage will merely cause the cores 19*a* and 19*b* to successively traverse their respective hysteresis loops.

Figure 4A:
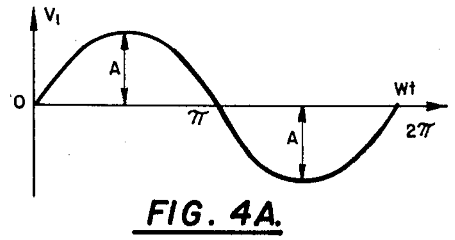
Figures 4A and 4B are waveforms illustrating respectively sinewave and squarewave carrier voltage waveforms of the type normally employed in conjunction with the magnetic amplifier circuit of Figure 1.
Figure 4B:
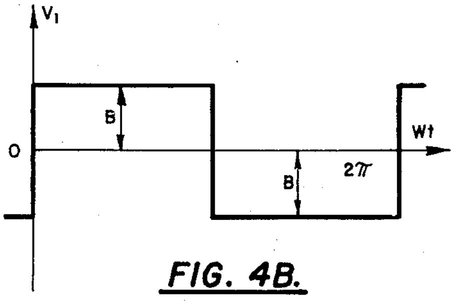

Referring to Figures 4A and 4B, it will be seen that the carrier waveform normally utilized in an arrangement such as has been described in reference to Figure 1, may be either of sinewave or of squarewave configuration, and in either event the said carrier voltage waveforms have in the past been symmetrical, and have exhibited an average value of zero. The only requirement in the utilization of waves such as have been depicted in Figures 4A and 4B, however, is that, for optimum gain-bandwidth product, the amplitude "A" or "B" of the waves, respectively be of such magnitude that the waves have sufficient energy content to cause the magnetic amplifiers to traverse their complete hysteresis loops during an applied cycle of carrier potential. Under the operating conditions described previously in reference to Figure 1, no input potential is presented by input circuit 21 other than the input bias supplied to effect a desired output from the amplifier under "no-signal" conditions.

If we should now assume, however, that a signal is applied from the said input circuit 21, which signal is positive on line 20 and negative on the line 23, this input signal will be coupled to both the windings 17 and 18 of the magnetic amplifiers shown. The signal, being of the polarity assumed, namely, positive on line 20 and negative on line 23, will tend to oppose the resetting function of current alternately being fed from the "On" magnetic amplifier core to the "Off" magnetic amplifier core. Thus, while in the absence of a signal input, conduction from diode 13 and winding 15 of the lefthand magnetic amplifier will tend to reset the righthand magnetic amplifier to its minus remanence point, while conduction through the diode 14 and winding 16 of the righthand magnetic amplifier will tend to reset the lefthand magnetic amplifier in turn to its minus remanence point, the application of a signal input, positive on line 20 and negative on the line 23, will effectively oppose such resetting. Within a number of cycles of input carrier voltage, determined in part by the magnitude of input signal, the circuit will therefore commence producing an output across the load $R_L$. The number of such carrier cycles required to produce a desired output is representative of the rise time of the amplifier.

The actual output voltage obtained across the load $R_L$ will be dependent upon the time length of the input from signal source 21 as well as upon the magnitude thereof and thus any desired output between a minimum output state and a maximum output state may be obtained by appropriate selection of the signal input from the source 21. The polarity of signal input just described is, of course, an instantaneous situation and, while the carrier frequency is high in respect to the signal frequency, it relates more particularly to the phase of the input signal with respect to the resetting current being coupled from one amplifier to the other.

If we should now assume that the amplifier shown in Figure 1 is in fact producing an output appearing across the load $R_L$, the said output may be decreased, and may in fact be reduced substantially to zero by removing the said input signal and permitting the negative bias in series with source $R_S$ to bring the amplifier to minimum desired output. Under such circumstances, therefore, the source $R_S$ will supply a potential (normally a bias potential) which is negative on the line 20 and positive on the line 23. As was discussed previously, the application of such a negative potential or bias from source $R_S$ will, after a number of cycles determined by the fall time of the amplifier (which fall time is in part inversely proportional to the magnitude of the said negative potential), cause the output to be diminished substantially to zero.

If, however, the instantaneous polarity of the input potential across windings 17 and 18 is sufficiently negative on the line 20 and at the upper ends of amplifier windings 17 and 18, this instantaneous negative input potential will be inductively coupled to each of the amplifier windings 15 and 16 and will cause conduction of diodes 13 and 14. Thus, under appropriate operating conditions, the negative potential portion of an applied input on the line 20, serving to reduce the output of the two-core self-saturating magnetic amplifier circuit shown, will cause current to flow from ground through both transformer winding portions 11 and 12, through diodes 13 and 14 and thence through the load $R_L$. Thus, power may well be delivered to the load circuit from the signal or input circuit, which situation results in a waste of a considerable and substantial portion of the input power. In the case of a sinewave carrier, a relatively small value of input or bias potential, in the polarity sense described, namely, negative on line 20 and positive on line 23, will cause such conduction in the diodes 13 and 14 when the potentials across winding portions 11 and 12 are near zero. This waste of input power decreases the power gain-bandwidth product of the amplifier and further puts highly undesirable restrictions upon the type of input circuit 21 which may be utilized.

Figure 5A:
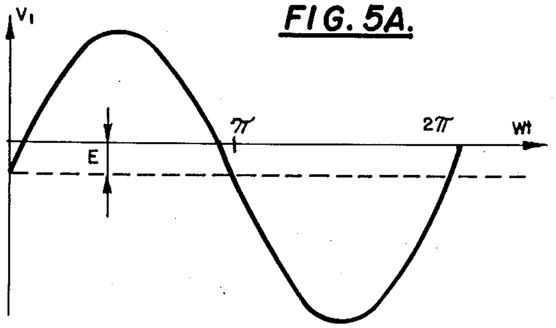
Figures 5A and 5B are respectively sinewave and squarewave carrier voltage waveforms effected in accordance with the present invention.
Figure 5B:
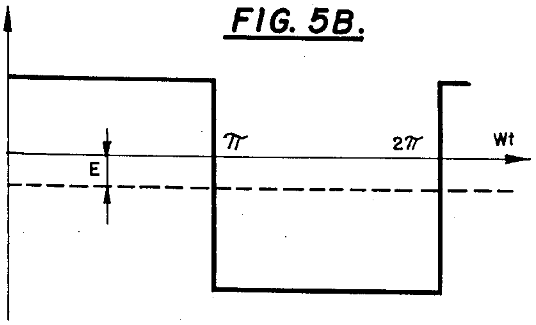

In accordance with the present invention, these highly undesirable operating characteristics may be obviated by use of an asymmetrical carrier voltage waveform in place of the symmetrical carrier waveforms previously discussed in reference to Figures 4A and 4B. Thus, referring to Figures 5A and 5B, it will be seen that, rather than having a symmetrical carrier waveform, the sinewave or squarewave carrier applied via carrier transformer 10 to winding portions 11 and 12 should preferably exhibit an average negative value "—E." When energized by waveforms of this asymmetrical configuration, it has been found that the fall time or input power, or both, of the two-core self-saturating magnetic amplifier, may be reduced below corresponding values in conventional circuits. The power gain-bandwidth product of the amplifier is thus materially increased and the power waste from signal circuit to load circuit during the fall of amplifier output is, of course, substantially decreased.

Figure 2:
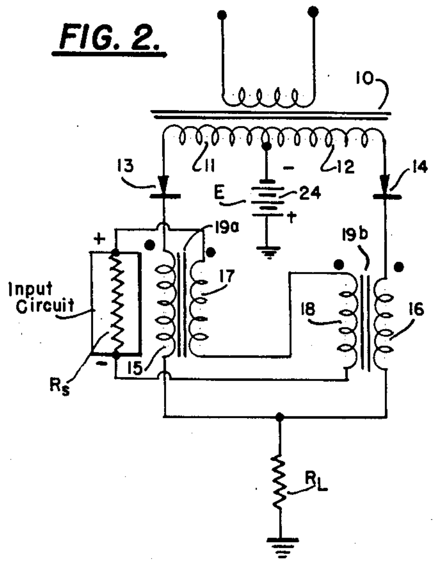
Figure 2 is a circuit diagram showing a two-core self-saturating magnetic amplifier energized by an asymmetrical carrier in accordance with one form of the present invention.

Such an asymmetrical waveform may be supplied from generation circuitry directly supplying wave shapes of this configuration. The same effect may further be realized, however, by proper disposition of bias potentials with respect to the magnetic amplifier circuit described previously. Thus, referring to Figure 2 it will be seen that a two-core self-saturating magnetic amplifier circuit in accordance with the present invention may take substantially the same form as that discussed with reference to Figure 1, but that a direct voltage source 24 may be inserted, for instance, in the grounded center tap connection of the winding 11—12 of transformer 10. Such a direct voltage source 24 should have a magnitude "E" equal to the negative average value desired of the asymmetrical carrier wave and should be poled so that the negative terminal thereof is coupled via the transformer winding 11—12 to the anodes of the rectifiers 13 and 14. The insertion of such a voltage source 24 will cause the carrier waveforms to assume the configuration, with respect to a zero line, shown in reference to Figures 5A and 5B, and will accomplish the several advantages discussed previously. In this respect is should further be noted that when the zero line is so shifted the amplitude of the carrier wave should be increased sufficiently above the said zero line that the magnetic amplifiers will still be caused to traverse their entire hysteresis loops during an applied cycle of carrier potential.

Figure 3:
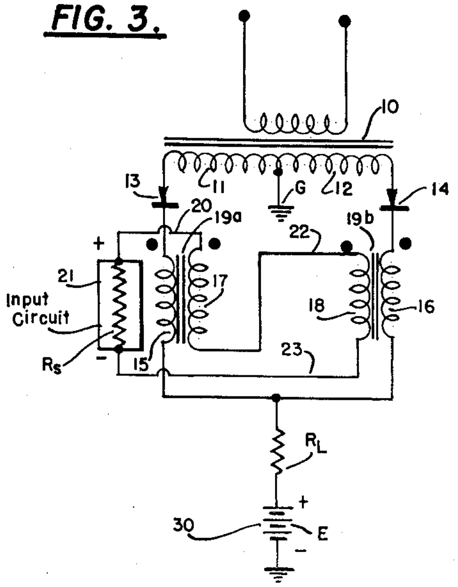
Figure 3 is a circuit diagram of a two-core self-saturating magnetic amplifier in accordance with a further embodiment of the present invention.

The same effect may be achieved, as is shown in Figure 3, by the insertion of a direct voltage source 30 in series with the load $R_L$ and again the polarity of the said source 30 should be such that the anodes of the rectifiers 13 and 14 are rendered negative to the cathodes thereof. Once more it should be noted that the amplitude of the alternating components of carrier voltage must be increased so that the rectified average between diode anode and the lower end of the load is sufficient to flip the cores. Of course a combination of the embodiments shown in Figures 2 and 3 may be utilized, if desired, in which event separate voltage sources may be inserted in both the grounded center tap of the transformer winding 11—12 and in the ground return of the load impedance $R_L$.

Figure 6:
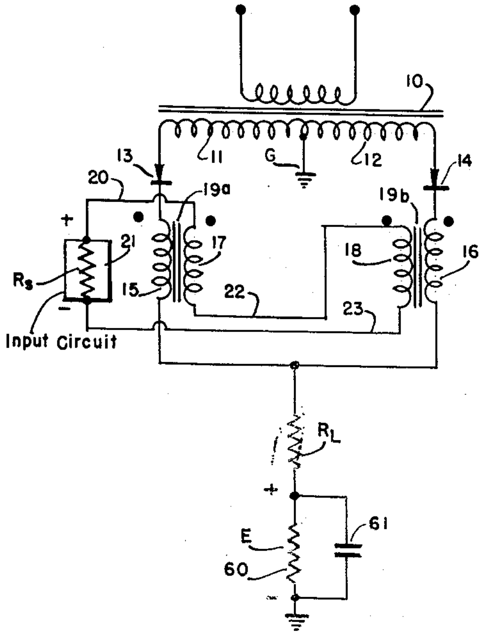
Figure 6 is a further circuit diagram of a two-core self-saturating magnetic amplifier in accordance with another embodiment of the present invention.

If the amplifier of the present invention should be utilized in amplifying A.C. signals only (there being no D.C. component) as may be the case with signals from a magnetic pick-up head or from any transformer-coupled or capacitor-coupled input signal, a circuit such as has been illustrated in Figure 6 may be used. In the arrangement shown therein the shift in center line of the alternating carrier wave may be effected by inserting a resistor 60, by-passed at the signal frequency by a capacitor 61, in series with the load $R_L$. This arrangement will serve to produce a substantially direct voltage of the desired polarity in series with the load $R_L$ whereby the circuit will operate in substantially the same manner as has been described previously. While the R–C circuit 60—61, of Figure 6, has been shown as interposed between the bottom of load $R_L$ and ground, it should be noted that such an R–C circuit, or circuits, may be interposed above load $R_L$ and/or in the grounded center tap G. These latter arrangements have the advantage of permitting one end of load $R_L$ to be grounded.

While we have described several embodiments of the present invention, it must be understood that the foregoing description is meant to be illustrative only and is not limitative of this invention. Many variations will be suggested to those skilled in the art, and such variations which are in accord with the principles discussed previously, are meant to fall within the scope of the present invention.

Figures 8, 9A, 9B:
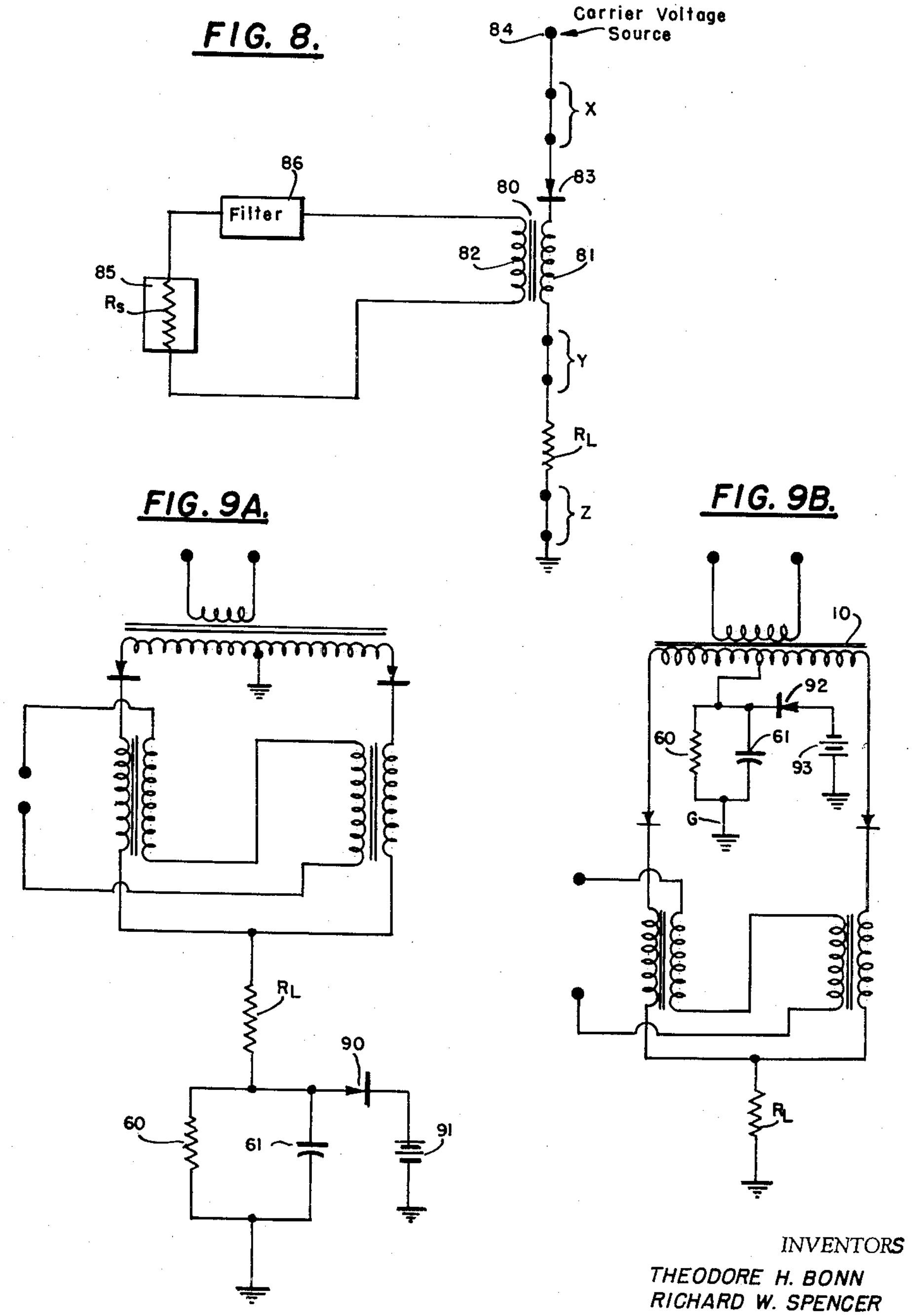
Figure 8 is a schematic diagram illustrating the application of the present invention to single core carrier type magnetic amplifiers.

Thus, referring to Figure 8 for instance, it will be seen that the asymmetrical carrier arrangement discussed previously may also be applied to single core type magnetic amplifiers. Such an amplifier as shown in Figure 8 may comprise a magnetic core 80, preferably but not necessarily exhibiting a hysteresis loop of the type shown in Figure 7, and may further comprise power or output winding 81 and a signal or input winding 82 carried by the said core 80. One end of the power or output winding 81 is coupled via a rectifier 83 to a source of carrier potential 84 and the other end of the said power or output winding 81 may be coupled via a load resistor $R_L$ to ground. As before, the signal or input winding 82 may be energized from an input circuit 85 again having an internal resistance $R_S$ and a low pass filter 86 is preferably interposed between the source 85 and signal or input winding 82 to keep the carrier potential out of the said signal source. The arrangement of Figure 8 may be such that a source of reverting current (not shown) is coupled to the power or output winding 81 whereby in the absence of a resultant signal across winding 82 the core 80 is caused to merely traverse its hysteresis loop without producing an output across $R_L$. On the other hand, the arrangement shown in Figure 8 may be such that in the absence of a resultant signal across winding 82 an output normally appears across $R_L$ and a signal from the said source 85 will serve to inhibit such an output. In either event, however, the preceding discussion with respect to the advantages derived from the use of an asymmetrical carrier apply with equal force to the single core carrier type magnetic amplifier, and the desired asymmetric carrier potential may in fact be achieved by using any of the circuits discussed previously, interposed for instance at any of the points X, Y and/or Z shown in Figure 8.

In addition, other modifications of the circuits shown will be suggested to those skilled in the art. Thus, referring to the arrangement of Figure 6 wherein an R–C circuit is utilized to provide a self bias, it may be desired to employ in addition a clamp diode thereby to prevent the bias from rising above or dropping below some maximum or minimum desired value. Such clamping means may be useful for instance where unidirectional pulses of variable duty cycle are to be amplified. As before, the bias resistor 60 in the R–C circuit should be chosen to provide correct bias under no signal conditions and the diode clamp would then be utilized to prevent this predetermined bias from changing appreciably in case of a rise or fall of average load current due to a high input pulse density. Two possible arrangements in accordance with this further modification are illustrated in Figures 9A and 9B. Thus, as is shown in Figure 9A, the arrangement of Figure 6 may be modified by adding clamp means comprising a series connected diode 90 and battery 91 to ground, each of which is poled as shown. A still further modification is shown in Figure 9B wherein the R–C circuit 60—61 is interposed in the grounded center tap G of the transformer 10 rather than below the load resistor $R_L$. When this latter modification is employed, the clamp means may again comprise a series connected diode 92 and battery 93 to ground and it will be noted that the diode 92 and battery 93 are each poled oppositely to the diode 90 and battery 91. Each of the arrangements shown in Figures 9A and 9B serves to provide an arrangement permitting positive output pulses to be obtained. If it is desired, for instance, to clamp the carrier amplifiers shown for negative output pulses, the precise arrangements shown in Figures 9A and 9B may still be employed except that the diodes 90 and 92 will be oppositely poled respectively.

While several of the above discussed embodiments of the present invention have taught an asymmetry producing element connected effectively in series with the load, it should be noted that such an arrangement is by no means mandatory and that it is quite possible and in fact may often be highly preferable to place such an asymmetry producing element in parallel with the load.

When this latter arrangement is utilized, it is further often desirable to provide a constant current sync in combination with the parallel connected asymmetry producing element, whereby the quiescent current of the amplifier may be readily adjusted. Such an arrangement has been shown in Figure 10, and, as will be seen from an examination of that figure, a voltage source $E_1$ may be connected in series with the load $R_L$ either above or below the said load impedance. The voltage source $E_1$ is preferably adjustable as shown, whereby the ratio of $E_1$ to $R_L$ may be varied, thereby to adjust the quiescent current of the amplifier. A further voltage source $E_2$ is connected in parallel with the said load impedance $R_L$, preferably through a diode 95; and once more the said voltage source $E_2$ is preferably adjustable in nature thereby to determine and control the amount of asymmetry produced.

Figure 10:
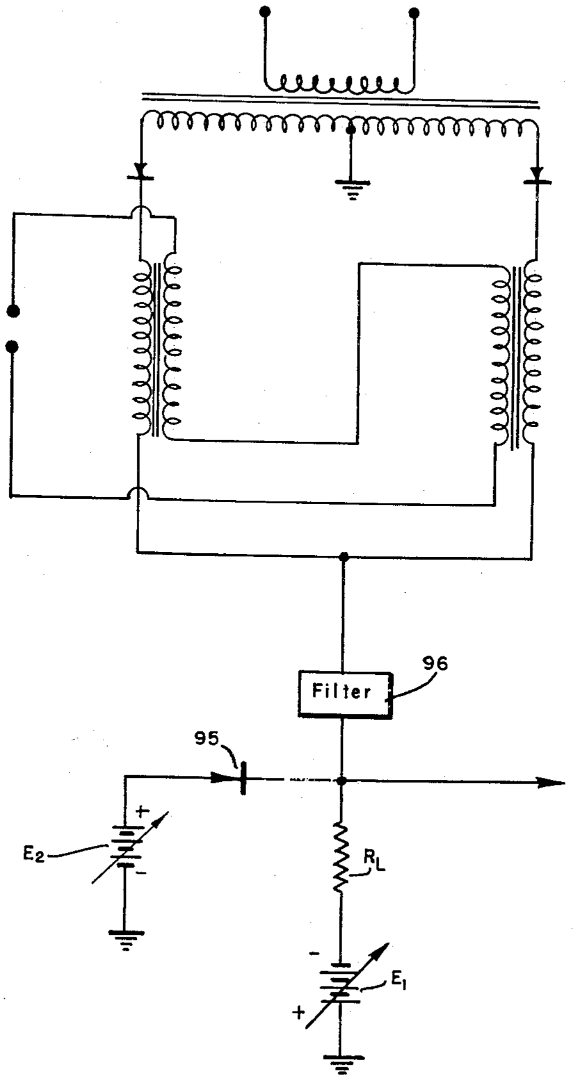
Figure 10 illustrates a still further modification in accordance with the present invention wherein an asymmetry producing device is connected in parallel with the amplifier load.

It should further be noted that in the arrangement of Figure 10 a filter 96 has been provided between the amplifier and its load. Such a filter may be supplied to smooth the pulsating output of the amplifier and may in fact be utilized in any of the embodiments previously described. However, the use of such a filter is entirely optional and will often depend upon the requirements of an overall system with which the amplifier is to be utilized.

In respect to the particular showings discussed previously, it should be noted further that while the load $R_L$ has been represented by a resistor in the several circuit figures, in practice this load may comprise a gate, the primary circuit of an output transformer, a filter, or any passive network which has a finite D.C. resistance. Still further modifications will be apparent from the foregoing discussion.

What is claimed is:

1. A magnetic amplifier comprising two cores of magnetic material each of which has first and second windings thereon, means connecting said first windings to one another and to a source of signal potential, means coupling one end of each of said second windings to one end of a load impedance, transformer means having a primary winding energized by a carrier wave of alternating potential, said transformer means having a secondary winding the opposite ends of which are coupled respectively to the other ends of each of said second windings, said transformer secondary winding further having a center tap coupled to the other end of said load impedance, and means shifting the average value of said carrier wave potential whereby said carrier is asymmetrical in potential.

2. The amplifier of claim 1 including rectifier means in series with each of said second windings.

3. A magnetic amplifier comprising two cores of magnetic material each of which has first and second windings thereon, means connecting said first windings to one another and to a source of signal potential, means coupling one end of each of said second windings to one end of a load impedance, transformer means having a primary winding energized by a carrier wave of alternating potential, said transformer means having a secondary winding the opposite ends of which are coupled respectively to the other ends of each of said second windings, said transformer secondary winding further having a center tap coupled to the other end of said load impedance, and means shifting the average value of said carrier wave potential whereby said carrier is asymmetrical in potential, said last-named means comprising direct potential producing means interposed between said center tap and said other end of said load impedance.

4. A magnetic amplifier comprising two cores of magnetic material each of which has first and second windings thereon, means connecting said first windings to one another and to a source of signal potential, means coupling one end of each of said second windings to one end of a load impedance, transformer means having a primary winding energized by a carrier wave of alternating potential, said transformer means having a secondary winding the opposite ends of which are coupled respectively to the other ends of each of said second windings, said transformer secondary winding further having a center tap coupled to the other end of said load impedance, and means shifting the average value of said carrier wave potential whereby said carrier is asymmetrical in potential, said center tap and the said other end of said load impedance being each connected to ground, said last-named means comprising direct potential producing means interposed between said center tap and ground.

5. The amplifier of claim 1 in which said center tap and the said other end of said load impedance are each connected to ground, said last-named means comprising direct potential producing means interposed between said other end of said load impedance and ground.

6. A magnetic amplifier comprising two cores of magnetic material each of which has first and second windings thereon, means connecting said first windings to one another and to a source of signal potential, means coupling one end of each of said second windings to one end of a load impedance, transformer means having a primary winding energized by a carrier wave of alternating potential, said transformer means having a secondary winding the opposite ends of which are coupled respectively to the other ends of each of said second windings, said transformer secondary winding further having a center tap coupled to the other end of said load impedance, and means shifting the average value of said carrier wave potential whereby said carrier is asymmetrical in potential, said last-named means comprising a resistor and by-pass capacitor connected in parallel with one another, said parallel connected resistor and capacitor being interposed between said center tap and the other end of said load impedance.

7. The amplifier of claim 6 including clamp means coupled to said parallel connected resistor and capacitor.

8. A magnetic amplifier comprising two cores of magnetic material each of which has first and second windings thereon, means connecting said first windings to one another and to a source of signal potential, means coupling one end of each of said second windings to one end of a load impedance, transformer means having a primary winding energized by a carrier wave of alternating potential, said transformer means having a secondary winding the opposite ends of which are coupled respectively to the other ends of each of said second windings, said transformer secondary winding further having a center tap coupled to the other end of said load impedance, and means shifting the average value of said carrier wave potential whereby said carrier is asymmetrical in potential, said last-named means comprising an R–C network in series with said load impedance.

9. A magnetic amplifier comprising two cores of magnetic material each of which has first and second windings thereon, means connecting said first windings to one another and to a source of signal potential, means coupling one end of each of said second windings to one end of a load impedance, transformer means having a primary winding energized by a carrier wave of alternating potential, said transformer means having a secondary winding the opposite ends of which are coupled respectively to the other ends of each of said second windings, said transformer secondary winding further having a center tap coupled to the other end of said load impedance, and means shifting the average value of said carrier wave potential whereby said carrier is asymmetrical in potential, said last-named means comprising an R–C network interposed between said center tap and ground.

10. A magnetic amplifier comprising two cores of magnetic material each of which has first and second windings thereon, means connecting said first windings to one another and to a source of signal potential, means coupling one end of each of said second windings to one end of a load impedance, transformer means having a primary winding energized by a carrier wave of alternating potential, said transformer means having a secondary winding the opposite ends of which are coupled respectively to the other ends of each of said second windings, said transformer secondary winding further having a center tap coupled to the other end of said load impedance, and means shifting the average value of said carrier wave potential whereby said carrier is asymmetrical in potential, said last-named means comprising bias means connected in parallel with said load impedance 11. A magnetic amplifier comprising first and second cores of magnetic material, first and second power windings on said cores respectively, signal winding means carried by both said cores, a source of signals coupled to said signal winding means, a source of alternating carrier wave potential having a repetition rate higher than that of said signal source, said carrier source including means producing a two-phase asymmetrical alternating potential as measured across said power windings, a first rectifier coupling one phase of said carrier source to one end of said first power winding, a second rectifier coupling the other phase of said carrier source to one end of said second power winding, and load means coupled to the other ends of said first and second power windings, said two-phase carrier source including a transformer having a center-tapped secondary winding, the opposing ends of said secondary winding being coupled to said first and second rectifier means respectively, said load means being connected between said center-tap and said other ends of said power windings, said asymmetry producing means comprising means connected in series with said load means for producing a D.C. potential.

References Cited in the file of this patent

UNITED STATES PATENTS

| | | |
|---|---|---|
| 2,027,312 | Fitzgerald | Jan. 7, 1936 |
| 2,341,526 | Breitenstein | Feb. 15, 1944 |
| 2,388,070 | Middel | Oct. 30, 1945 |
| 2,516,563 | Graves | July 25, 1950 |
| 2,700,130 | Geyger | Jan. 18, 1955 |
| 2,710,952 | Steagall | June 14, 1955 |
| 2,745,056 | Zucchino | May 8, 1956 |
| 2,747,109 | Montner | May 22, 1956 |
| 2,909,723 | Scorgie | Oct. 20, 1959 |

FOREIGN PATENTS

| | | |
|---|---|---|
| 125,025 | Australia | June 24, 1946 |